United States Patent
Li et al.

(10) Patent No.: US 9,640,968 B2
(45) Date of Patent: May 2, 2017

(54) ARC FAULT CIRCUIT INTERRUPTER

(71) Applicant: Chengli Li, Suzhou (CN)

(72) Inventors: Chengli Li, Suzhou (CN); Guolan Yue, Suzhou (CN)

(73) Assignee: Chengli Li, Suzhou (CN)

( * ) Notice: Subject to any disclaimer, the term of this patent is extended or adjusted under 35 U.S.C. 154(b) by 486 days.

(21) Appl. No.: 14/306,686

(22) Filed: Jun. 17, 2014

(65) Prior Publication Data

US 2015/0155698 A1    Jun. 4, 2015

(30) Foreign Application Priority Data

Dec. 2, 2013  (CN) .......................... 2013 1 0631687

(51) Int. Cl.
*H02H 1/00* (2006.01)
*H02H 3/04* (2006.01)

(52) U.S. Cl.
CPC ........... *H02H 1/0015* (2013.01); *H02H 3/044* (2013.01)

(58) Field of Classification Search
CPC .............................. H02H 1/0015; H02H 9/04
USPC .......................................................... 361/42
See application file for complete search history.

(56) References Cited

U.S. PATENT DOCUMENTS

| | | | |
|---|---|---|---|
| 6,452,767 B1 * | 9/2002 | Brooks | H01H 71/125 361/42 |
| 6,477,021 B1 * | 11/2002 | Haun | H01H 71/125 324/520 |
| 8,514,537 B2 | 8/2013 | Higuchi | |
| 2005/0146824 A1 | 7/2005 | Borrego | |
| 2005/0231876 A1 | 10/2005 | Komatsu et al. | |
| 2007/0208981 A1 | 9/2007 | Restrepo et al. | |
| 2011/0134575 A1 | 6/2011 | Ward et al. | |

FOREIGN PATENT DOCUMENTS

CN    101246195 A    8/2008

OTHER PUBLICATIONS

Chinese Office Action, dated Jan. 25, 2017 in a counterpart Chinese patent application, No. CN 201310631687.4.

* cited by examiner

*Primary Examiner* — Dharti Patel
(74) *Attorney, Agent, or Firm* — Chen Yoshimura LLP

(57) ABSTRACT

An arc fault detection circuit for an arc fault circuit interrupter (AFCI). The arc fault detection circuit includes an arc detecting circuit for detecting an arc fault in one or more power supply lines and outputting a detected signal, an arc filtering circuit electrically coupled to an output terminal of the arc detecting circuit for removing signal parts unrelated to the arc fault from the detected signal and outputting a filtered half-cycle signal, and an arc processing circuit electrically coupled to an output terminal of the arc filtering circuit for generating, based on the filtered half-cycle signal received, a processed half-cycle signal characterizing the arc fault. The arc fault detection circuit also includes simulated arc testing circuit that has a user-touchable test switch, and an arc oscillator to generate a simulated arc fault signal for testing the arc fault detection circuit or its respective components.

14 Claims, 7 Drawing Sheets

ARC FAULT CIRCUIT INTERRUPTER

This application claims foreign priority benefits under 35 U.S.C. §119(a)-(d) from China Patent Application No. 201310631687.4, filed on Dec. 2, 2013, which is incorporated by reference in its entirety.

BACKGROUND OF THE INVENTION

Field of the Invention

This invention relates to electrical safety protection, and in particular, it relates to an arc fault circuit interrupter (AFCI) that can precisely detect and identify arc faults in electrical circuitries and devices.

Description of the Related Art

Currently, fire caused by arc faults between the hot (L) and neutral (N) lines, L and L lines or L and ground lines in electrical wirings inside homes or consumer electrical appliances constitutes a grave threat to people's life and property. At present there is not a very few products that focus on arc fault detection, but most of them utilizes digital circuitry or micro-computer unit (MCU), which makes them not very reliable. For example, when a digital circuitry or an MCU receives a weak detection signal in an arc-like but none-arc status, it often makes an erroneous determination. In addition, detection of arc signal is often affected by various load and electromagnetic interferences, which will also lead to an erroneous determination.

Therefore, it is desirable to provide a highly reliable circuitry that can accurately detect arc fault signals and protect corresponding power supply and/or loads.

SUMMARY OF THE INVENTION

To solve the problems discussed above, the present invention provides an AFCI that can accurately detect arc faults and protect corresponding power supply.

Therefore, an object of the present invention is to overcome the shortcomings of the conventional AFCIs as or similar to the ones discussed above, and provide an AFCI that can precisely detect and identify arc faults in electrical circuitries and devices.

Additional features and advantages of the invention will be set forth in the descriptions that follow and in part will be apparent from the description, or may be learned by practice of the invention.

The objectives and other advantages of the invention will be realized and attained by the structures, circuitries and functionalities particularly pointed out in the written description and claims thereof as well as the appended drawings.

To achieve these and/or other objects, as embodied and broadly described, one of the exemplary embodiments of the present invention provides an arc fault detection circuit for an AFCI. The arc fault detection circuit includes an arc detecting circuit for detecting an arc fault in one or more power supply lines and outputting a detected signal, an arc filtering circuit electrically coupled to an output terminal of the arc detecting circuit for removing signal parts unrelated to the arc fault from the detected signal and outputting a filtered half-cycle signal, and an arc processing circuit electrically coupled to an output terminal of the arc filtering circuit for generating, based on the filtered half-cycle signal received, a processed half-cycle signal characterizing the arc fault. The arc fault detection circuit also includes simulated arc testing circuit that has a user-touchable test switch, and an arc oscillator to generate a simulated arc fault signal for testing the arc fault detection circuit or its respective components.

In one exemplary embodiment of the present invention, the arc processing circuit includes an half-cycle amplifying module for amplifying the filtered half-cycle signal received; and an arc triggering module electrically coupled to the output terminal of the half-cycle amplifying module for generating the processed half-cycle signal based on the filtered half-cycle signal, so that the originally low-amplitude filtered half-cycle signal can still have sufficient power or driving capability.

In one exemplary embodiment of the present invention, the half-cycle amplifying module includes at least one linear amplifier.

In one exemplary embodiment of the present invention, the arc triggering module includes at least one operational amplifier or at least one 555 timer.

In one exemplary embodiment of the present invention, the arc triggering module includes at least one logic gate circuit.

In one exemplary embodiment of the present invention, the arc detecting circuit includes at least one arc detect ring which, when the current input into the arc detect ring is at least 1 A, can output at least 0.5V voltage, so that the arc detecting circuit can accurately detect the existence of an arc. Also when the output has certain amplitude, it can be used by subsequent circuits, therefore lowering the circuit design complicity.

In one exemplary embodiment of the present invention, the arc filtering circuit includes a voltage regulating module electrically connected to the arc detecting circuit for outputting a multi-amplitude half-cycle periodic voltage signal corresponding to the detected signal, wherein the half-cycle periodic voltage signal has the same phase; and a phase-shifting module electrically connected to the output terminal of the voltage regulating module for deriving the filtered half-cycle signal from the half-cycle periodic voltage signal, so that the half-cycle periodic signal can precisely reflect the periodic output voltage of the arc detect ring to facilitate the signal filtering by subsequent circuits.

In one exemplary embodiment of the present invention, the phase-shifting module is an at least bi-level resistor-capacitor (RC) circuit, so that the arc related signal can be derived.

In one exemplary embodiment of the present invention, the arc fault detection circuit also includes an arc fault triggering circuit which has at least one solenoid (SOL) electrically connected to the arc processing circuit for generating switching control signal based on the processed half-cycle signal; a switch circuit electrically connected to the arc fault triggering circuit to open the input/output switch of the power supply lines in response to the switch control signal.

In one exemplary embodiment of the present invention, the arc fault detection circuit further includes a simulated arc testing circuit, its output terminal electrically connected to the arc filtering circuit or the arc processing circuit, for generating a simulated arc signal, so that the switch circuit can open the input/output switch of the power supply lines in response to the simulated arc signal.

In one exemplary embodiment of the present invention, the simulated arc testing circuit includes a user-touchable test switch and an oscillator having an oscillating frequency not less than 100 Hz, where the simulated arc testing circuit determines whether to output the simulated arc signal based on the open/close status of the test switch, so that an arc signal can be simulated to test the circuit modules.

In one exemplary embodiment of the present invention, the arc oscillator includes at least one inductor-capacitor (LC) oscillating circuit.

In one exemplary embodiment of the present invention, the LC oscillating circuit uses the solenoid (SOL) as the inductor, so that the LC oscillating circuit uses the lease number of components by double-using the inductor, thereby effectively reducing the size and cost of the product.

In one exemplary embodiment of the present invention, the arc fault detection circuit also includes a power supply circuit which includes a current-rectifying bridge and a solenoid (SOL) for providing electrical power to the arc processing circuit, the arc fault triggering circuit and the simulated arc testing circuit.

In one exemplary embodiment of the present invention, the arc fault triggering circuit includes at least one silicon controlled rectifier (SCR), where the control terminal of the SCR is electrically connected to the output terminal of the arc processing circuit.

The present invention AFCI primarily uses analog circuitry to achieve arc fault detection. Comparing to the conventional products primarily utilizing digital circuitries, the present invention is advantageous in its characteristics of high precision, low cost, low power consumption and fast speed, etc.

It is to be understood that both the foregoing general description and the following detailed description are exemplary and explanatory and are intended to provide further explanation of the invention as claimed.

BRIEF DESCRIPTION OF THE DRAWINGS

The features and advantages of the preferred embodiment of the present invention can be further understood from the detailed description below with reference to the following drawing.

DETAILED DESCRIPTION OF THE PREFERRED EMBODIMENTS

Figure 1:
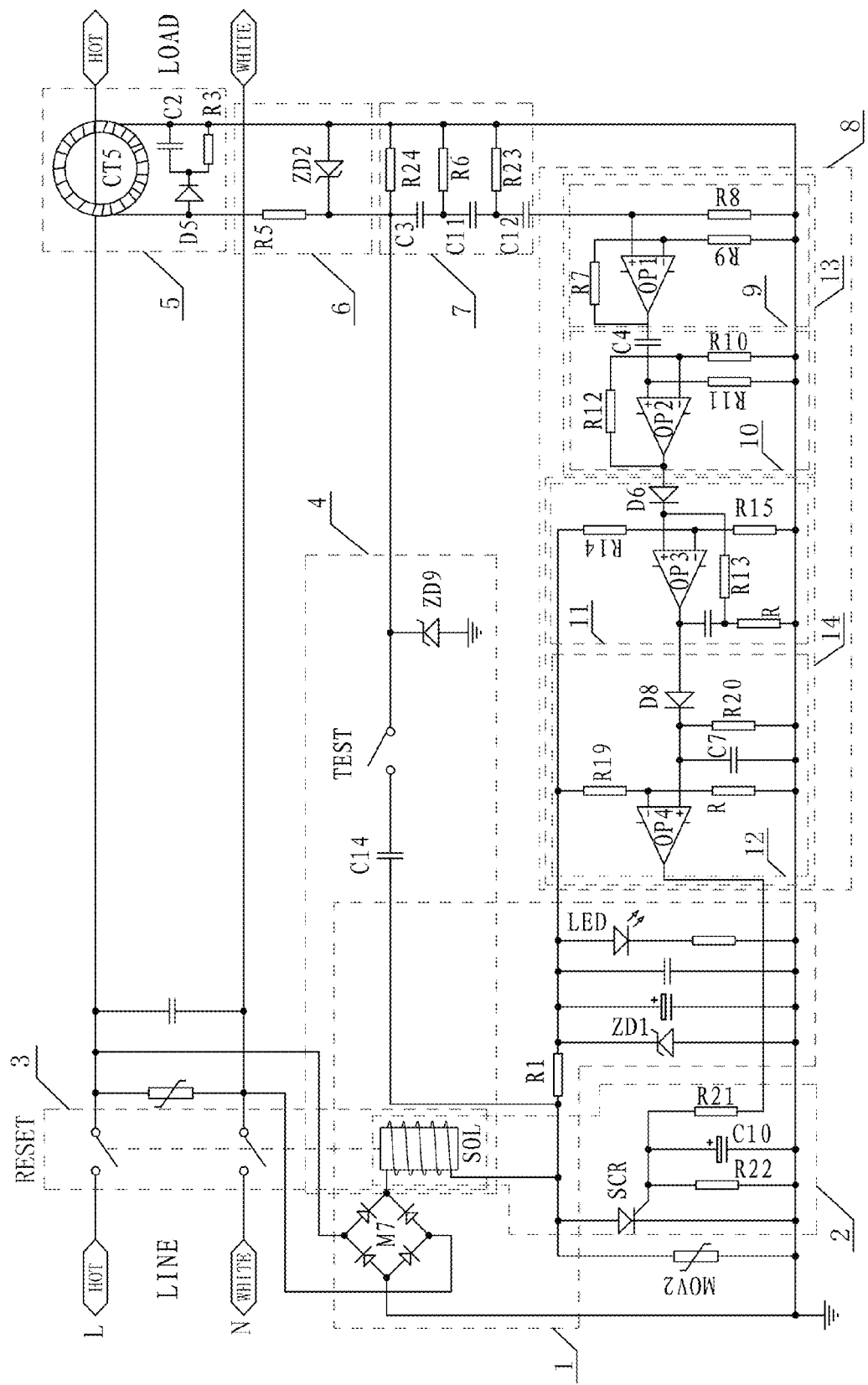
FIG. 1 is a circuit diagram of an AFCI according to a preferred embodiment of the present invention.

The following presents a detailed description of the preferred embodiment (as well as other alternative embodiments) of the present invention. As required, detailed illustrative embodiments of the present invention are disclosed herein, in conjunction with the drawing figures. However, techniques, systems and operating processes in accordance with the present invention may be embodied in a wide variety of circuitries and modules, some of which may be quite different from those in the disclosed embodiment. Consequently, the specific circuitry and components details disclosed herein are merely representative, yet in that regard, they are deemed to afford the best embodiment for purposes of disclosure and to provide a basis for the claims herein, which define the scope of the present invention.

Referring to FIG. 1, there is shown an arc fault detection circuit of an AFCI according to a preferred embodiment of the present invention. The arc fault detection circuit includes a power supply circuit 1, an arc fault triggering circuit 2, a switch circuit 3, a simulated arc testing circuit 4, an arc detecting circuit including an arc detect ring 5, an arc filtering circuit including a voltage regulating circuit 6 and an RC phase-shifting network circuit 7, and an arc processing circuit 8 which is an analog circuit including a first half-cycle amplifying circuit 9, a second half-cycle amplifying circuit 10, a first triggering circuit 11 and a second triggering circuit 14.

When the power lines function normally without fault, the voltage waveform of the L line and N line appears as normal Sine waves. When there is a fault in the power line or electrical load, there will be an arc in the waveform. In the circuitry shown in FIG. 1, the fault arc will be between the L and N lines, where the arc detect ring 5 connected in series with L line will detect the fault and output the detected signal which includes the fault arc.

It should be understood by persons skilled in the relevant art that detected signal includes at least two components: a voltage part that corresponds to the fault arc, and a voltage part that corresponds to the alternate current (AC) on the L line.

Before the switch 3 opens (i.e., cut-off) the electrical circuitry, arc detect ring 5 will continue to output the detected signal to the coupled voltage regulating circuit 6, so that the amplitude of the detected signal can be limited, thereby lowering the requirement to the subsequent circuits and increasing the safety of the AFCI product.

To increase the sensitivity of the arc detect ring 5, it may be wound with sheet-type magnetic-conducting material such as silicon sheet. When the input current of the arc detect ring 5 is 1 A, it can generate at least 0.5 V voltage.

The phase-shifting network circuit 7 is used to filtering out the voltage part that corresponds to the alternate current (AC) on the L line in the detected signal from the output of the voltage regulating circuit 6, so that only the voltage part that corresponds to the fault arc remains, which is the filtered half-cycle signal. The phase-shifting network circuit 7 then transmits the filtered half-cycle signal to the arc processing circuit 8.

The arc processing circuit 8 then process the filtered half-cycle signal received and generate the processed half-cycle signal which is used for triggering the arc fault triggering circuit 2 to thereby change the connection status of the L and N lines. The processed half-cycle signal characterizes, and has the characteristics of, the arc between the L and N lines.

Preferably, in order to allow the users to ascertain whether the AFCI is functional or to test the functions of its circuitry components, the present invention embodiment also includes a simulated arc testing circuit 4. In FIG. 1, the output of the simulated arc testing circuit is coupled with the phase-shifting network circuit 7, such that when the simulated arc testing circuit produces a simulated arc signal upon the user's request, the phase-shifting network circuit 7 will select the signal that corresponds to the simulated fault arc and transmit it to the arc processing circuit 8. If the arc fault triggering circuit can cut-off the power between the L and N lines upon receiving the simulated arc signal, then it shows that the circuitry between the RC phase-shifting network circuit 7 and the arc fault triggering circuit 2 is functioning normally without malfunction.

It should be understood by persons skilled in the relevant art that alternatively, the output of the simulated arc testing circuit 4 can be coupled to and test a circuit module of the voltage regulating circuit 6 or the arc processing circuit 8, which makes malfunction determination and circuit maintenance very convenient.

Figure 2:
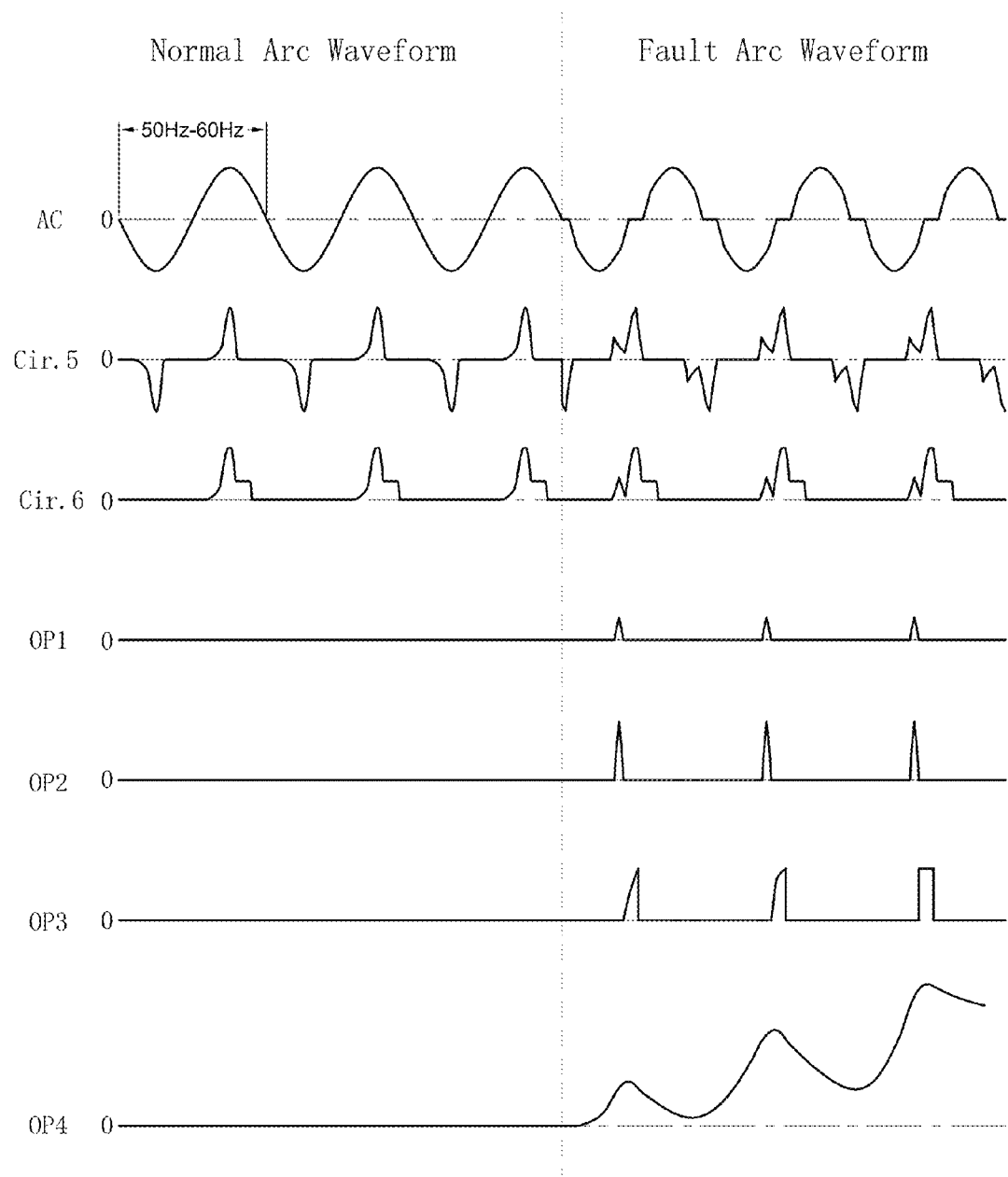
FIG. 2 is a waveform diagram of a normal arc and a fault arc according to a preferred embodiment of the present invention.

Referring to FIG. 2, there is shown a waveform diagram of a normal arc and a fault arc according to a preferred embodiment of the present invention.

The two ends of the winding of arc detect ring 5 are connected through capacitor C2, diode D5 and resistor R3, outputting voltage signals to voltage regulating module 6. Voltage regulating module 6 includes current-limiting resistor R5 and voltage regulator ZD2.

When the circuitry functions normally without fault, the waveform in L line is a complete Sine wave. When there is an arc fault, the voltage waveform in L line is incomplete. Correspondingly, when there is an arc fault, the output waveform of the arc detect ring 5 becomes sharp with spikes. Obviously the spike is a signal corresponding to the arc fault. The output of the voltage regulator has only half a cycle, which can represents the characteristics of the output of the arc detect ring 5. The phase-shifting network circuit 7 is formed by three levels of RC phase-shifting circuits, including resistors R6, R23 and R24, and capacitors C3, C11 and C12. Each of these RC phase-shifting circuit can phase-shift the half-cycle signals that it has received, select the half-cycle signal that has the needed phase and frequency and also corresponds with the arc fault, and then output the half-cycle signal to the next level.

Preferably, when the alternate current (AC) is 50-60 Hz, the phase-shift network circuit 7 is configured to filter out the below-60 Hz signal part but keep the above-60 Hz signal part.

In this preferred embodiment of the present invention, the arc processing circuit 8 includes a first half-cycle amplifying circuit 9, a second half-cycle amplifying circuit 10, a first half-cycle triggering circuit 11 and a second triggering circuit 12. The first half-cycle amplifying circuit 9 is a positive linear amplifier, including operational amplifier OP1 and resistors R7-R9. The second half-cycle amplifying circuit 10 is also a positive linear amplifier, including operational amplifier OP2, capacitor C4 and resistors R10-R12. The output of operational amplifier OP1 is coupled through capacitor C4 to the positive input of operational amplifier OP2. The output of operational amplifier OP2 is coupled to diode D6. In static state, the first and second half-cycle amplifying circuits 9 and 10 output low level voltages. But when the operational amplifiers are changing from static to dynamic status, the first and second half-cycle amplifying circuits 9 and 10 output high level voltages.

It should be understood by persons skilled in the relevant art that the first and second half-cycle amplifying circuits may utilize other types of amplifiers not limited to linear amplifiers.

The first triggering circuit 11 is a mono-stable circuit, including operational amplifier OP3, resistors R13-R15, R and capacitor C5. The positive input of operational amplifier OP3 is coupled to the anode of diode D6. When operational amplifier outputs a high level voltage, diode D6 is conductive, the voltage at the positive input of operational amplifier OP3 in the first triggering circuit 11 will abruptly change, i.e., from high level to low level voltage, which causes the reverse of the output signal. Therefore, as the operational amplifier OP2 periodically outputs low level voltages, operational amplifier OP3 will periodically output pulse signals.

The second triggering circuit 12 includes operational amplifier OP4. The positive input of operational amplifier OP4 is coupled through diode D8 and resistor R17 to the output of operational amplifier OP3. The second triggering circuit 12 outputs stronger pulse signals with higher triggering capacity.

It should be understood by persons skilled in the relevant art that the first and second triggering modules may be oscillators formed by operational amplifiers but may also be oscillators that include 555 timer(s).

The arc fault triggering circuit 2 includes solenoid SOL, SCR, capacitor C10, and resistors R21, R22. The output of operational amplifier OP4 is coupled through resistor R21 to the gate of SCR, so that SCR can control the arc fault triggering circuit 2 based on the signal received from operational amplifier OP4, i.e., the conductivity of SCR can be controlled by the output pulse signal of the operational amplifier OP4. When the SCR is conductive, the input/output switching circuit 3 will open, i.e., cut-off, the power supply. In other words, strong current will flow through solenoid SOL to generate a magnetic field which causes the core to move to open switching circuit 3.

The above is the process through which the arc fault detection circuit completes the functions from detecting arc fault to shutting down the electrical supply.

The arc fault detection circuit also includes a simulated arc testing circuit 4 to generate simulated arc signals upon the users' input, so that it can be checked whether the arc fault detection circuit may cut-off electrical supply when receiving the simulated arc signal, and further determine whether any circuit/module of the arc fault detection circuit is malfunction.

Preferably, simulated arc testing circuit 4 couples to the phase-shifting circuit 7 and arc processing circuit 8.

Preferably, simulated arc testing circuit 4 generates simulated arc signals having an oscillating frequency not less than 100 Hz.

Simulated arc testing circuit 4 includes solenoid SOL, capacitor C14, voltage regulator ZD9 and test button TEST. Solenoid SOL and capacitor C14 form an LC series resonance circuit, and voltage regulator ZD9 limits the amplitude of the output signal.

The simulated arc testing circuit 4 in FIG. 1 uses the lease amount of components with double-usage of the inductance component, which helps to reduce the size and cost of the product.

In addition, the arc fault detection circuit also includes a power supply circuit 1 which includes a rectifier bridge M7 and solenoid SOL for providing power to the arc processing circuit, arc fault triggering circuit and the simulated arc testing circuit.

Figure 3:
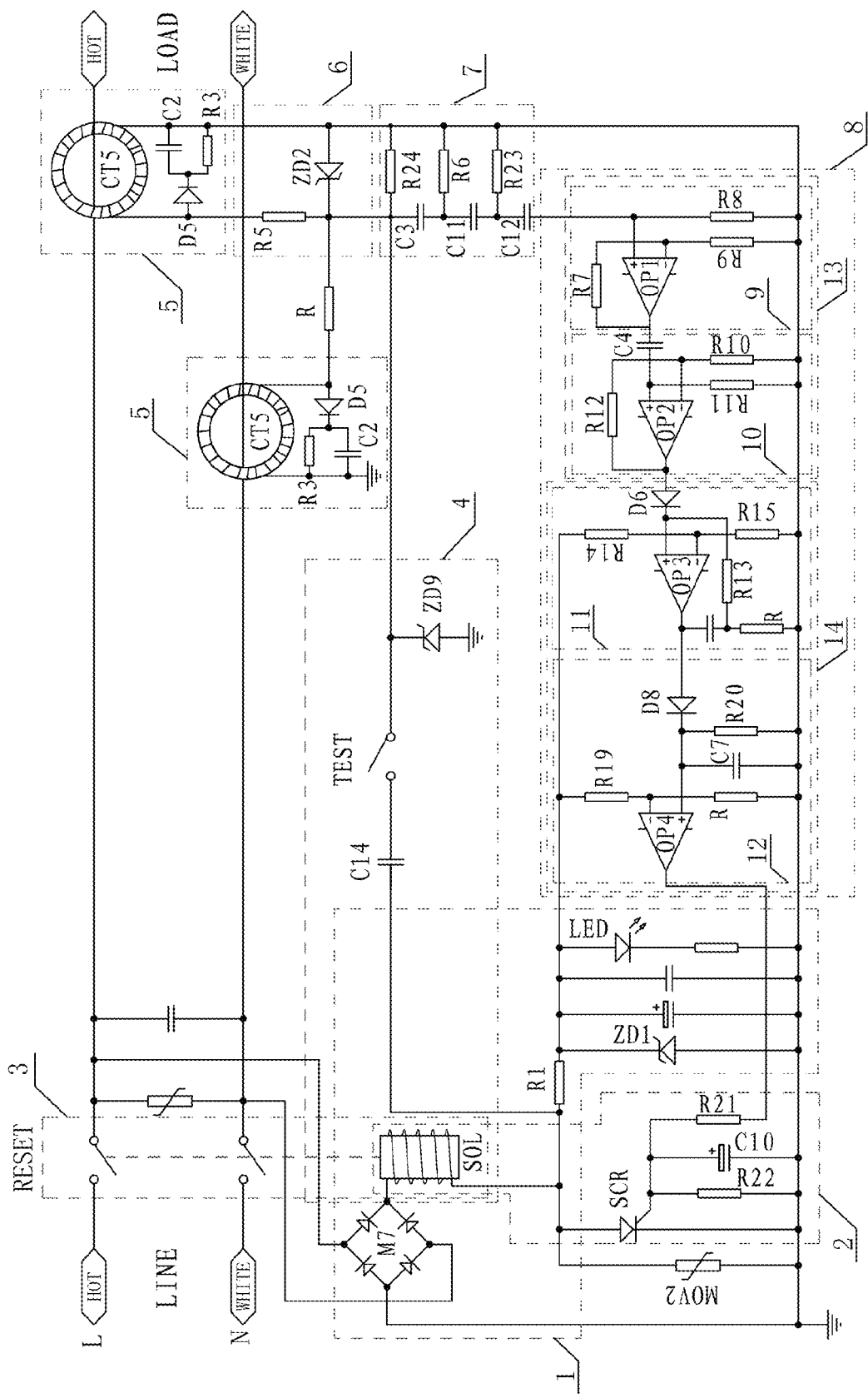
FIG. 3 is a circuit diagram of an AFCI according to another preferred embodiment of the present invention.
Figure 4:
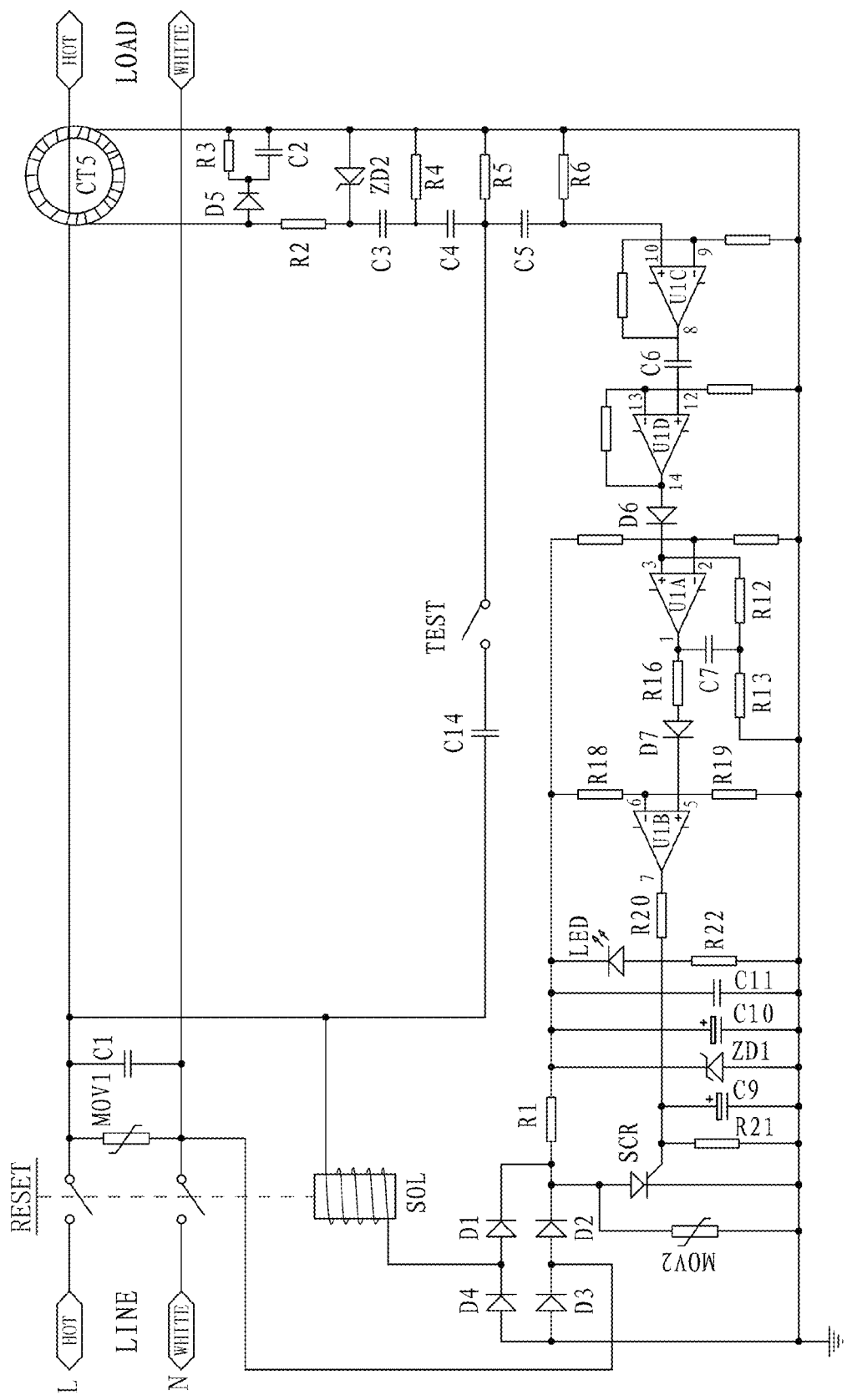
FIG. 4 is a circuit diagram of the simulated arc testing circuit of the AFCI according to an alternatively preferred embodiment of the present invention.
Figure 5:
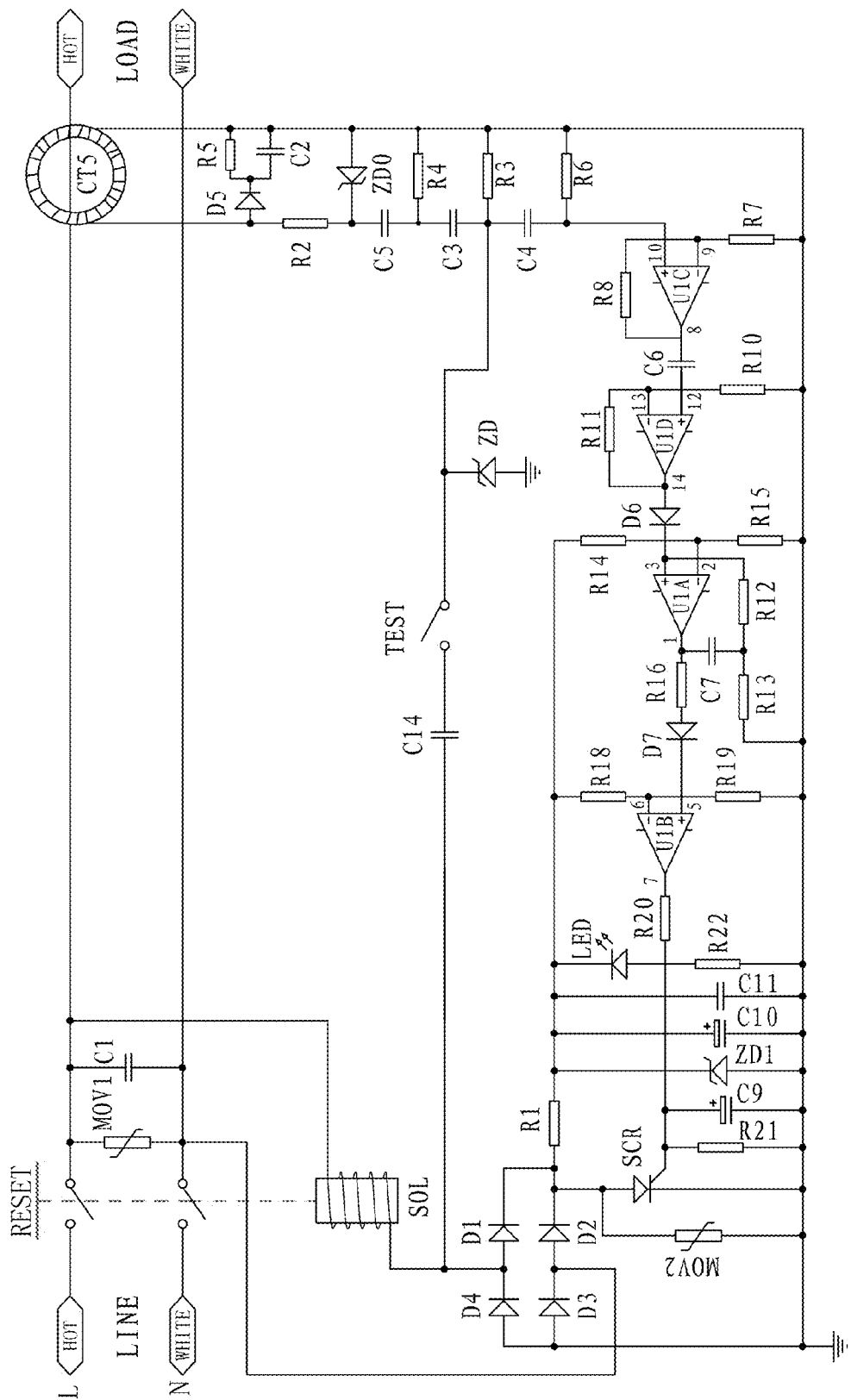
FIG. 5 is a circuit diagram of the simulated arc testing circuit of the AFCI according to another alternatively preferred embodiment of the present invention.
Figure 6:
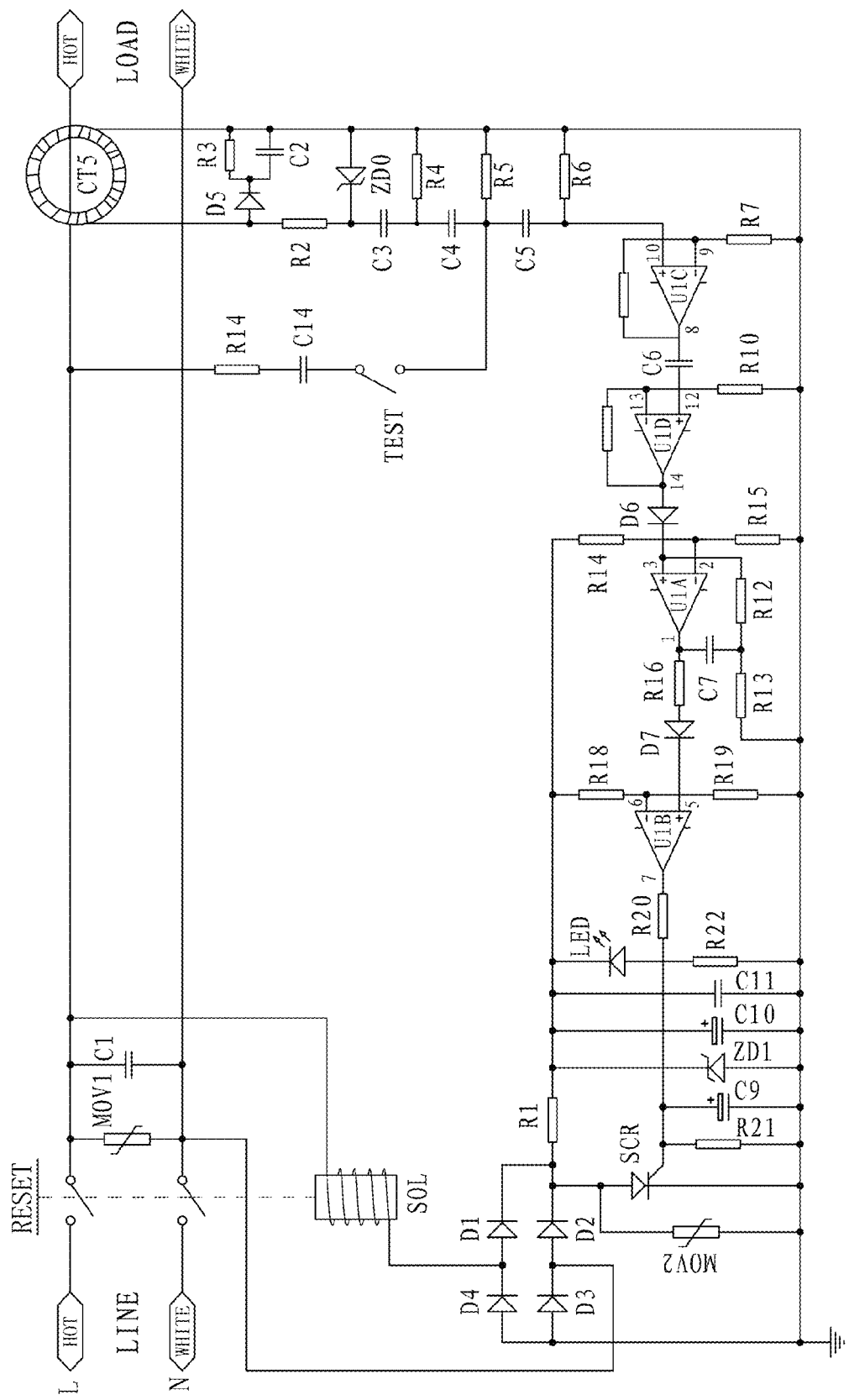
FIG. 6 is a circuit diagram of the simulated arc testing circuit of the AFCI according to still another alternatively preferred embodiment of the present invention.
Figure 7:
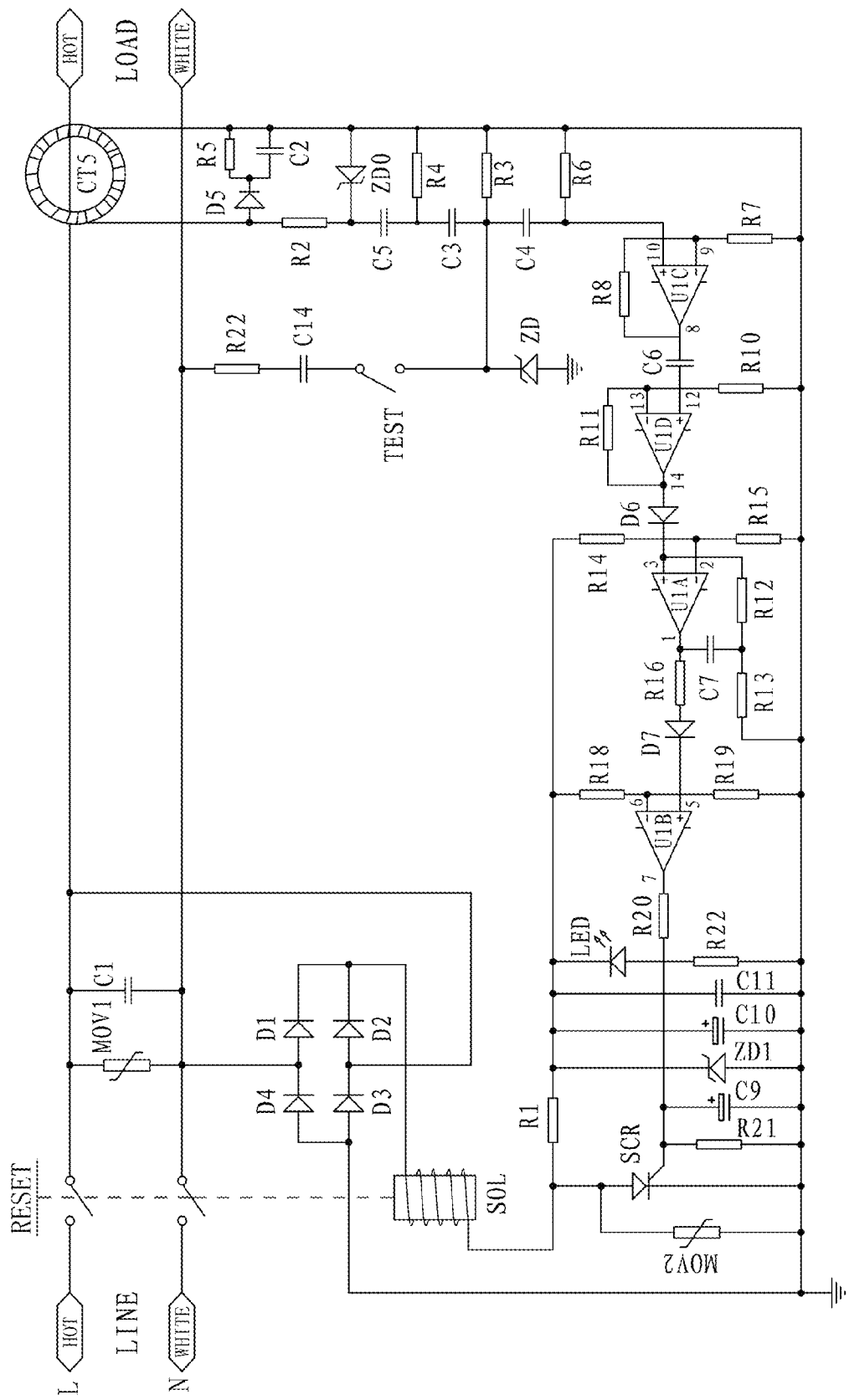
FIG. 7 is a circuit diagram of the simulated arc testing circuit of the AFCI according to still another alternatively preferred embodiment of the present invention.

Referring to FIG. 3, there is shown a circuit diagram of an AFCI according to another preferred embodiment of the present invention. The difference between the circuits shown in FIGS. 1 and 3 is that in the circuit shown in FIG. 3, the arc fault detection circuit has two detection rings CTS, coupled to lines L and N respectively. In this embodiment, the arc fault detection circuit detects the arc on lines L and N. When either or both lines L and N have an arc fault, the arc fault detecting circuit will open the electrical supply lines based on the detected arc fault signal.

When both lines L and N have arc fault, the two detected signals will be summed at the same node but because of the voltage regulation by the current-limiting resistor R5 and voltage regulator ZD9, the output of the voltage regulating circuit will still be limited within certain range. Hence the voltage regulating circuit increases the stability and applicability of the arc fault detection circuit.

Referring to FIGS. 4 through 7, there are shown alternative designs of the simulated arc testing circuit 4 of the AFCI according to other preferred embodiments of the present invention. In all these alternative designs, the simulated arc testing circuit 4 includes test button TEST and capacitor C14. The differences are that in FIGS. 4 and 5, the simulated arc testing circuit 4 is coupled to solenoid SOL, but in FIGS. 6 and 7 the simulated arc testing circuit 4 is directly coupled to power line L or N. In addition, in FIGS. 5 and 7 a grounding diode ZD is added, and in FIG. 6 a limiting resistor R4 is added. In these designs, AC voltage is limited to a pre-determined level when applied to the test button TEST through the coupling of capacitor C14, and then delivered to the phase-shifting network circuit 7, thereby completing the testing of the arc fault detection circuit.

The AFCI device provided by the present invention has many advantages over conventional digital products. The present invention AFCI uses analog circuitry and has high precision and fast speed, yet is small in size, and low in cost and power consumption.

It will be apparent to those skilled in the art that various modification and variations, either in electronic hardware or by computer software or through combinations thereof, can be made in the circuitry, module, functionality and operations of the embodiments of the present invention, as generally described above for illustration and through examples of circuitry, module, functions and processes, without departing from the spirit or scope of the invention. Thus, it is intended that the present invention cover modifications and variations that come within the scope of the appended claims and their equivalents.

What is claimed is:

1. An arc fault detection circuit for an arc fault circuit interrupter (AFCI), comprising:
   an arc detecting circuit for detecting an arc fault in one or more power supply lines and outputting a detected signal;
   an arc filtering circuit electrically coupled to an output terminal of the arc detecting circuit for removing signal parts unrelated to the arc fault from the detected signal and outputting a filtered half-cycle signal, the arc filtering circuit comprising:
      a voltage regulating module electrically coupled to the arc detecting circuit for outputting a multi-amplitude half-cycle periodic voltage signal that corresponds to the detected signal; and
      a phase-shifting module electrically coupled to an output terminal of the voltage regulating module for deriving the filtered half-cycle signal from the multi-amplitude half-cycle periodic voltage signal; and
   an arc processing circuit electrically coupled to an output terminal of the arc filtering circuit for generating, based on the filtered half-cycle signal received, a processed half-cycle signal characterizing the arc fault.

2. The arc fault detection circuit of claim 1, wherein the arc processing circuit comprises:
   an half-cycle amplifying module for amplifying the filtered half-cycle signal; and
   an arc triggering module electrically coupled to an output terminal of the half-cycle amplifying module for generating the processed half-cycle signal based on the filtered half-cycle signal.

3. The arc fault detection circuit of claim 2, wherein the half-cycle amplifying module comprises at least one linear amplifier.

4. The arc fault detection circuit of claim 2, wherein the arc triggering module comprises at least one oscillator.

5. The arc fault detection circuit of claim 2, wherein the arc triggering module comprises at least one logic gate circuit.

6. The arc fault detection circuit of claim 1, wherein the phase-shifting module includes at least two levels of resistor-capacitor (RC) circuit.

7. The arc fault detection circuit of claim 1, further comprises:
   an arc fault triggering circuit comprising at least one solenoid and electrically coupled to the arc processing circuit for generating a switch control signal based on the processed half-cycle signal; and
   a switch circuit electrically coupled to the arc fault triggering circuit to open the power supply lines in response to the switch control signal.

8. The arc fault detection circuit of claim 7, wherein the arc fault triggering circuit comprises at least one silicon controlled rectifier (SCR) having its gate terminal electrically coupled to an output terminal of the arc processing circuit.

9. The arc fault detection circuit of claim 7, further comprises a simulated arc testing circuit for generating a simulated arc signal to cause the switch circuit to open the power supply lines.

10. The arc fault detection circuit of claim 9, wherein the simulated arc testing circuit is electrically coupled to the at least one solenoid.

11. The arc fault detection circuit of claim 9, wherein the simulated arc testing circuit is electrically coupled directly to one of the power supply lines.

12. An arc fault detection circuit for an arc fault circuit interrupter (AFCI), comprising:
   an arc detecting circuit for detecting an arc fault in one or more power supply lines and outputting a detected signal;
   an arc filtering circuit electrically coupled to an output terminal of the arc detecting circuit for removing signal parts unrelated to the arc fault from the detected signal and outputting a filtered half-cycle signal, the arc filtering circuit comprising:
      a voltage regulating module electrically coupled to the arc detecting circuit for outputting a multi-amplitude half-cycle periodic voltage signal that corresponds to the detected signal; and
      a phase-shifting module electrically coupled to an output terminal of the voltage regulating module for deriving the filtered half-cycle signal from the multi-amplitude half-cycle periodic voltage signal;
   an arc processing circuit electrically coupled to an output terminal of the arc filtering circuit for generating, based on the filtered half-cycle signal received, a processed half-cycle signal characterizing the arc fault; and
   a simulated arc testing circuit electrically coupled directly to one of the power supply lines for generating a simulated arc signal to cut-off the power supply lines.

13. The arc fault detection circuit of claim 12, wherein the simulated arc testing circuit further comprising:
   a user-touchable test switch; and
   an arc oscillator electrically coupled to the test switch.

14. The arc fault detection circuit of claim 12, wherein the simulated arc testing circuit further determines whether to output the simulated arc fault signal based on a status of the test switch for testing the arc fault detection circuit or its respective components.

* * * * *